(12) United States Patent
Holemans

(10) Patent No.: US 6,948,686 B2
(45) Date of Patent: Sep. 27, 2005

(54) CONSTANT RATE DEPLOYMENT DEVICE

(76) Inventor: Walter Holemans, 2303 Kansas Ave., Silver Spring, MD (US) 20910

( * ) Notice: Subject to any disclaimer, the term of this patent is extended or adjusted under 35 U.S.C. 154(b) by 8 days.

(21) Appl. No.: 10/408,728

(22) Filed: Apr. 7, 2003

(65) Prior Publication Data

US 2003/0192994 A1 Oct. 16, 2003

Related U.S. Application Data

(60) Provisional application No. 60/371,333, filed on Apr. 10, 2002.

(51) Int. Cl.[7] ............................................... B64G 1/00
(52) U.S. Cl. .................................. 244/158 R; 244/173
(58) Field of Search ...................... 244/158 R, 137.1, 244/137.4, 173; 89/1.57, 1.81; 114/318, 319

(56) References Cited

U.S. PATENT DOCUMENTS

| | | | | |
|---|---|---|---|---|
| 3,689,055 A | * | 9/1972 | Gende ......................... 267/150 |
| 4,246,722 A | * | 1/1981 | Sapkus et al. ............... 446/320 |
| 4,836,820 A | * | 6/1989 | Ebihara et al. .............. 446/289 |
| 5,056,739 A | * | 10/1991 | LeVay ................... 244/122 AC |
| 5,226,617 A | * | 7/1993 | Panin ..................... 244/158 R |
| 5,383,790 A | * | 1/1995 | Kerek et al. ................. 439/248 |
| 5,628,668 A | * | 5/1997 | Takemae .................... 446/355 |
| 5,711,412 A | * | 1/1998 | Gysin et al. ................. 198/732 |
| 5,755,407 A | * | 5/1998 | Aubret et al. ................ 244/161 |
| 6,301,981 B1 | | 10/2001 | Oechslin ......................... 74/1.5 |
| 6,390,416 B2 | * | 5/2002 | Holemans ............... 244/158 R |
| 6,416,018 B2 | * | 7/2002 | DiVerde et al. .......... 244/137.1 |
| 6,746,302 B2 | * | 6/2004 | Morikawa ................... 446/353 |
| 2004/0000206 A1 | * | 1/2004 | Beale ........................... 74/150 |

OTHER PUBLICATIONS

Bernhardt and Barube, CITRIS Antenna–Mechanical, Mar. 19, 2002, CITRIS on STPAT1–PDR.
Bowden, Mary L., "Deployment Devices", Space Vehicle Mechanisms: Elements of Successful Design, Peter L. Conley, Editor, John Wiley & Sons, Inc. 1998.

* cited by examiner

*Primary Examiner*—J. Woodrow Eldred
(74) *Attorney, Agent, or Firm*—Robert M. McDermott, Esq.

(57) ABSTRACT

A spring-based deployment system deploys a mass at a limited velocity. Using techniques common to the art of timepieces, the motion of a gear, like the rotation of a clock's second hand, is controlled to occur at a substantially constant rate. In a preferred embodiment, an escapement is used to limit the amount of motion per unit time, thereby limiting the velocity. During the period of motion, a high-force can be applied to overcome friction and other adverse affects. Because the amount of motion is limited by the escapement, the amount of kinetic energy produced by this high-force is limited, and thus the shock effects introduced when the deployed mass is stopped at its deployed state are limited. An optimized design can by achieved via an appropriate tradeoff between total deployment time and controlled deployment rate.

12 Claims, 2 Drawing Sheets

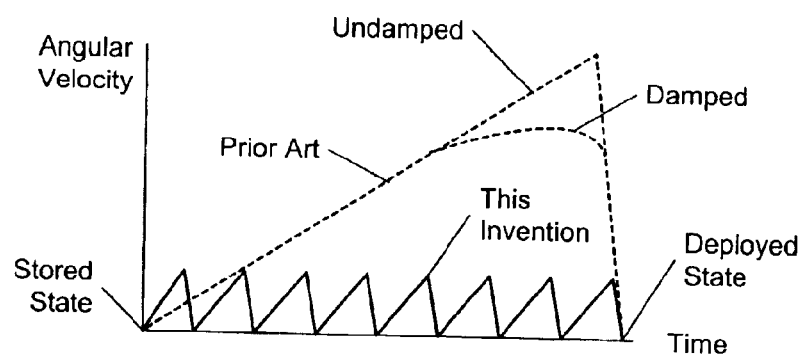
FIG. 3A
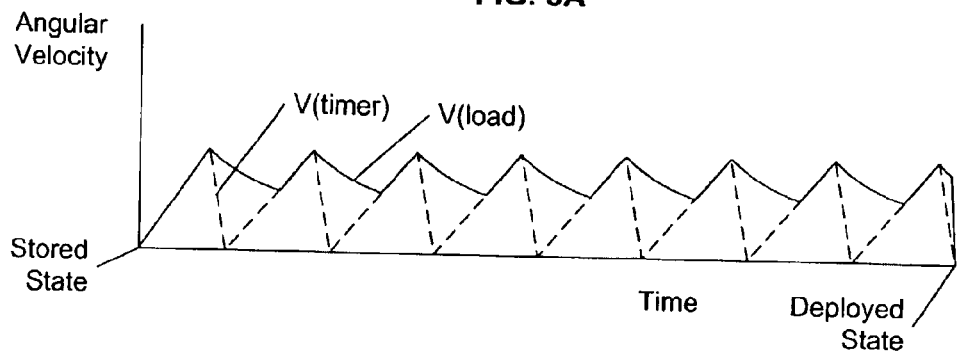
FIG. 3B
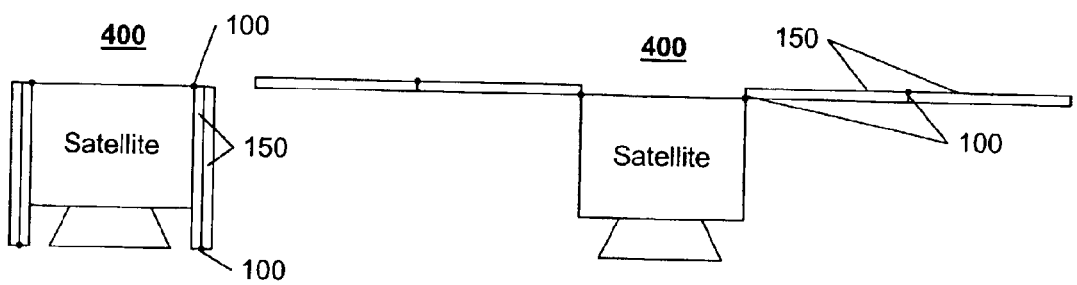
FIG. 4A  FIG. 4B

CONSTANT RATE DEPLOYMENT DEVICE

This application claims the benefit of U.S. Provisional Application No. 60/371,333, filed Apr. 10, 2002.

BACKGROUND OF THE INVENTION

1. Field of the Invention

This invention relates to the field of mechanical design, and in particular to the design of a deployment device that is configurable to provide a substantially constant deployment velocity. Such a device is particularly well suited for deployment of equipment associated with a spacecraft.

2. Description of Related Art

Hinges and other devices are commonly used to facilitate the deployment of equipment from a 'stored' state to a 'deployed' state. In a spacecraft system, for example, subsystems are stored in a compact form to facilitate stowage of the spacecraft in a launch vehicle. When the spacecraft is deployed to its operational orbit, or operational trajectory, the subsystems that support the mission of the spacecraft are deployed to their operational form. Antenna systems are deployed to provide a desired field of view; solar panels are deployed to provide a surface area that is sufficient to collect the energy required to power the equipment on the spacecraft; sensing devices are deployed at a relatively large distance from the space-craft to collect data that is substantially independent of the effects of the space-craft; and so on. Deployment systems are commonly used in other fields, but the field of aerospace places particularly stringent demands on the reliability and efficiency of space-craft deployment systems, and thus this invention is presented using the paradigm of a hinged deployment device that is particularly well suited for space-craft design.

Deployment systems generally face a set of conflicting requirements that are generally related to the 'starting' and 'stopping' of the deployment. The deployment must be reliably accomplished, and thus more force than is minimally required is typically used to effect the deployment, to provide a sufficient 'reliability margin'. Typically, this extra force is transferred to the mass in the form of excess kinetic energy. This excess kinetic energy must be dissipated at the end of deployment. A sudden stop of a rotating mass about a hinge introduces a substantial shock stress on the hinge and on the structure that is used to stop the mass. A sudden stop of an expanding telescope introduces a substantial shock stress on the limits used at each telescoping element.

Shock absorbers are commonly used to dampen the effects associated with stopping a moving mass, by stopping the mass gradually. An overdamped deployment system will generally cause a lack of full deployment and an underdamped deployment system does not fully abate the aforementioned shock effects. Generally, the costs of a failed deployment are significant, and most systems are purposely designed to be underdamped, and the design of the deployment system includes considerations for withstanding substantial shock effects.

An ideal deployment system is one that is able to apply a large amount of force, as required, to move the mass under a variety of non-ideal conditions, yet limit the terminal velocity of the mass at or below a given rate to minimize the amount of kinetic energy that must be dissipated to stop the motion of the mass.

An electric motor can be configured to approximate the characteristics of an ideal deployment system, via a regulated control of the energy/current that is applied to the motor to provide the appropriate torque and velocity. Such a solution, however, is often economically infeasible. In a spacecraft environment, the added mass and complexity of a motor also introduces other design considerations and tradeoffs. In the case of a solar-panel deployment system, for example, these additional considerations include the need to provide power to the motor before the solar panels are deployed.

Most commonly, tensioned springs are used in a deployment system. A tensioned coil spring about the axle of a hinge, for example, provides a simple and reliable means of supplying the force required to rotate a mass about the hinge. A compressed linear coil spring applied to a piston provides a simple and reliable means of supplying the force required to move a mass in a linear direction. The spring is typically designed to provide more than enough force to overcome a worst-case scenario of adverse conditions. As such, a substantial amount of dampening is required to minimize or reduce shock effects, as discussed above.

Commonly, dampening devices are fluidic or pneumatic in nature, and use a piston to force a fluid or gas through a restricted opening. In a fluidic system, the amount of dampening provided is substantially dependent upon the viscosity of the fluid. In a pneumatic system, the amount of dampening is substantially dependent upon the volume of gas being expelled. In both systems, the size of the restricted opening also determines the amount of dampening. In a typical spacecraft environment, the temperature differential can be as large as 200 degrees Celsius. Such a large temperature change can affect the viscosity of a fluid by a factor of 1000, and can have a substantial affect on gaseous volume and the effective area of the restricted opening. Because the damper must be designed so as not to overdamp the system under worst-case (e.g. maximum friction) conditions, the structure must be designed for the case of an underdamped system under opposite conditions (e.g. minimum friction). That is, a conventional spring-damper deployment system is over-designed to assure sufficient deployment force, then over-designed to minimize the effects caused by the over-designed deployment force. This combined over-design requires more massive hinges and stopping structures, again introducing additional design considerations and tradeoffs in a spacecraft design.

BRIEF SUMMARY OF THE INVENTION

It is an object of this invention to provide a deployment system that minimizes the deployment shock effects. It is a further object of this invention to provide a non-motorized deployment system that does not require a dampening system. It is a further object of this invention to provide a high-force spring-based deployment system that does not require a dampening system.

These objects, and others, are achieved by providing a spring-based deployment system that deploys a mass at a limited velocity. Using techniques common to the art of timepieces, the motion of the hinged mass, like the rotation of a clock's second hand, is controlled to occur at a substantially constant, or at least limited, rate. In a preferred embodiment, an escapement is used to limit the amount of motion per unit time, thereby limiting the velocity. During the period of motion, a high-force can be applied to overcome friction and other adverse affects. Because the amount of motion is limited by the escapement, the amount of kinetic energy produced by this high-force is limited, and thus the shock effects introduced when the hinged mass is stopped at its deployed state are limited. An optimized design can by achieved via an appropriate tradeoff between total deployment time and controlled deployment rate.

BRIEF DESCRIPTION OF THE DRAWINGS

The invention is explained in further detail, and by way of example, with reference to the accompanying drawings wherein:

FIG. 3 illustrates an example graph of angular velocity versus time for a deployment system in accordance with this invention.

FIG. 4 illustrates an example spacecraft with a hinged deployment system in accordance with this invention.

Throughout the drawings, the same reference numerals indicate similar or corresponding features or functions.

DETAILED DESCRIPTION OF THE INVENTION

Figure 1:
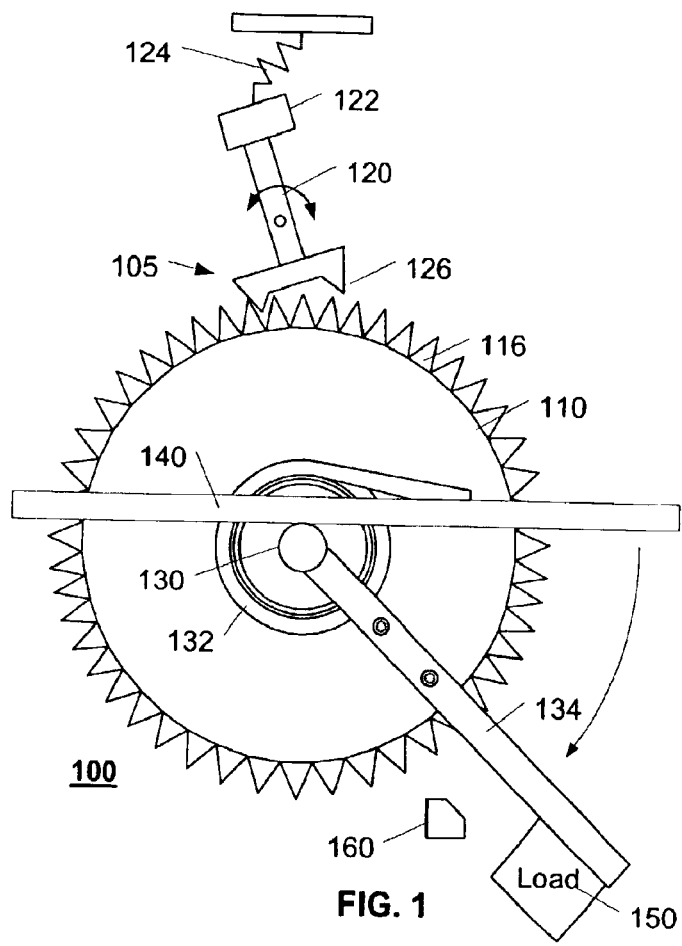
FIG. 1 illustrates an example diagram of a hinged deployment system in accordance with this invention.

FIG. 1 illustrates an example diagram of a hinged deployment system 100 in accordance with this invention. One of ordinary skill in the art will recognize that the drawing of FIG. 1 presents the principles of a sample embodiment of this invention, and is not meant to represent a scaled model of an actual deployment system. Of significance, the deployment system 100 includes an escapement 105 that serves to transfer the energy stored in a spring 132 to a wheel or gear 110 as a series of impulses.

As illustrated in FIG. 1, the escapement 105 includes a pallet 126 that engages and disengages teeth 116 of the gear 110, although any of a variety of escapements are common in the art of timepieces, as discussed further below. The pallet 126 is operably coupled to a balance 120, having a mass 122 that oscillates back and forth, thereby causing the periodic engagement and disengagement of the pallet 126 to the teeth 116 of the gear 110. A spring 124 facilitates the oscillation of the balance 120. Other means of providing an oscillating mechanism are also common in the art of timepieces, including the use of a flywheel and a coil spring that is wound when the flywheel spins in one direction, and unwound when the flywheel spins in the other direction. In a preferred embodiment, as common in the art of timepieces, the balance 120 receives the energy required to sustain oscillation from the spring 132 as well.

The spring 132 of FIG. 1 is attached to the gear 110 and to a fixed support 140, and is shown to be wound counterclockwise about an axle of a hinge 130, relative to the fixed support 140, thereby inducing a clockwise force on the gear 110. In the position shown in FIG. 1, the clockwise motion of the gear 110 is retarded by the engagement of the left end of the pallet 126 with the teeth 116 of the gear 110. When the mass 122 of the balance 120 moves to the right, under the influence of the return spring 124, the left end of the pallet 126 rises and the right end of the pallet 126 falls. The teeth 116 of the gear 110 are arranged relative to the pallet 126 such that the gear 110 advances by a half a tooth spacing during the release of the left end of the pallet 126 from the teeth 116 to the engagement of the right end of the pallet 126 with the teeth 116. The gear 110 is prevented from further angular movement by the engagement of the right end of the pallet 126 with the teeth 116.

After swinging to the right, the mass 122 reverses direction, under influence of the spring 124 (and the force of the gear 110 urging the pallet to the right, depending upon the particular shape of the pallet 126 and teeth 116), and swings back to the left. During this left motion of the mass 122, the right end of the pallet 126 disengages from the teeth 116 and the left end of the pallet 126 reengages with the teeth 116, advanced now by a full tooth-width relative to the original position illustrated in FIG. 1. Thus, the escapement 105 provides for a limited angular velocity of the gear 110, dependent upon the oscillation frequency of the balance 120, and the spacing of the teeth 116, and substantially independent of the amount of potential energy in the spring 132.

One of ordinary skill in the art will recognize that the pallet 126 and teeth 116 in the example of FIG. 1 are presented for illustration purposes, and that alternative shapes are commonly used for minimizing friction losses and/or optimizing the periodic latching function of the pallet 126 and teeth 116. Additionally, the latching function of the pallet 126 can be used to hold the gear 110 in a storage state before deployment. For example, in the example shown, if the mass 122 of the balance 120 is "locked" to the right, engaging the right side of the pallet 126 to the teeth 116 of the gear 110, the gear 110 will not be able to move. When the mass 122 is "released", the clockwise torque from the spring 132 will force the weight 122 to the left, thereby initiating a "self-start" oscillation. Other means of assuring a self-start to the oscillation of the balance 120 are common in the art of timepieces.

Note also that the example configuration of the balance 120 in FIG. 1 implies that the balance 120 will be urged in one direction (counterclockwise) by the (clockwise) torque of the spring 132, and will need to overcome at least a portion of the torque of the spring 132 as it travels in the other direction (clockwise). Techniques are common in the art that effectively decouple the balance that is used by an escapement from the forces used to drive the velocity-controlled gears. U.S. Pat. No. 6,301,981, "ESCAPEMENT FOR A TIMEKEEPER", issued Oct. 16, 2001 to Ludwig Oechslin of Lucerne, Switzerland, for example, teaches the use of two intermeshed gears, one of which is driven by a drive train, that alternately provides impulses to a balance in each direction, thereby providing a symmetric operation of the balance 120, and is incorporated by reference herein. This referenced patent also teaches the use of a locking and rocking mechanism that alternatively locks each of the two intermeshed gears in such a way that the losses typically incurred for releasing the engaged pallet against the torque of the drive train are avoided. These and other techniques for optimizing the performance of speed-controlling mechanisms in timepieces are common in the art, and can be used to limit the average velocity of a load during deployment in accordance with this invention.

For ease of understanding and illustration, a load 150 is illustrated as being fixedly attached to the gear 110 via a hinge arm 134 in FIG. 1. As the gear 110 rotates at the limited angular speed that is imposed by the escapement mechanism 105, the load is rotated away from the fixed structure 140, at the same limited angular speed, until it achieves a deployment state, when the hinge arm 134 abuts a deployment stop 160. Note that, because the angular velocity of the load 150 is controllable by the escapement 105, the shock effects on the stop 160 can be maintained below an acceptable level merely by suitably limiting the angular velocity, as discussed further below. Note also that, as mentioned above, the pallet 126 can be used to latch the gear 110 in a fixed position, and thus can be used in lieu of, or in addition to, the stop 160 for latching the hinge arm 134 in its deployed state. For example, one of the teeth 116 on the gear 110 can be configured to force the pallet 126 into a "locked" position when a specific angular rotation occurs, or the teeth 116 may occupy only a fixed segment of the circumference of the gear 110, so as to prevent the oscillation of the pallet 126 beyond the end of the segment. These and other techniques for preventing the periodic engagement and disengagement of the escapement, or preventing the movement of the gear 110 or the load 150 will be evident to one of ordinary skill in the art in view of this disclosure.

One of ordinary skill in the art will also recognize that the load 150 may be coupled to the limited-velocity gear 110 via a variety of techniques common in the art, including the use of other gears of different sizes to effect an appropriate speed and force/torque combination, and the use of ratcheting mechanisms to optimize the energy transfer in the desired direction. In like manner, one of ordinary skill in the art will recognize that the effective motion of the load 150 is not limited to angular motion. The gear 110 could, for example, be coupled to a piston to impart a linear deployment of the load 150. In like manner, the gear 110 could have a linear, rather than circular, arrangement of teeth 116, to provide a linear force at the rate that is controlled by the escapement 105, as illustrated in FIG. 2.

Figure 2:
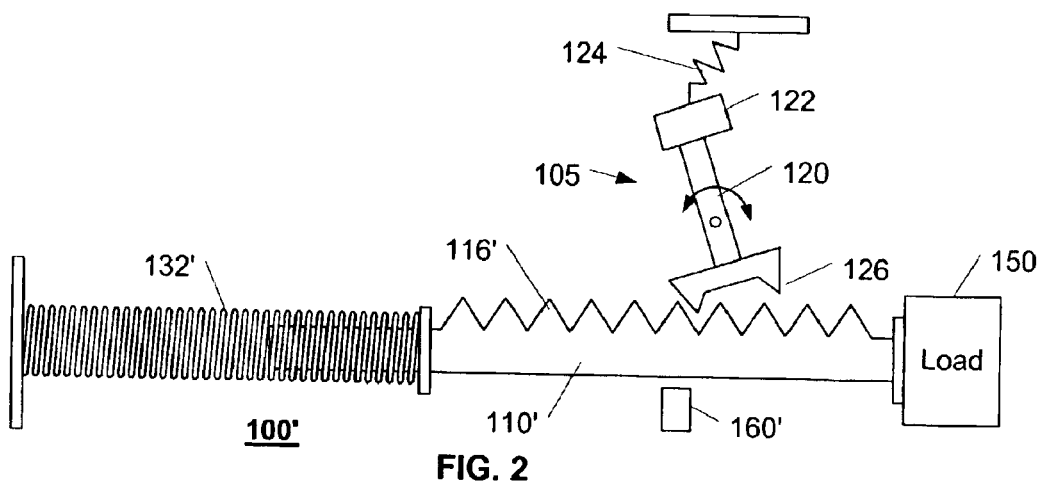
FIG. 2 illustrates an example diagram of a linear deployment system in accordance with this invention.

FIG. 2 illustrates an alternative linear deployment device 100' in accordance with this invention. The items in FIG. 2 that differ from FIG. 1 but perform a similar function are identified with the same reference numeral as in FIG. 1, with an added prime (') symbol.

In FIG. 2, a spring 132' applies a force to move a gear 110', and thus the load 150, to the right. As in FIG. 1, an escapement 105 limits the effective speed of movement of the gear 110', via alternating engagements of the pallet 126 with the teeth 116' of the gear 110'. Also as in FIG. 1, alternative escapement techniques may be employed, and additional gears and other mechanical devices may be employed to couple the gear 110' to the load 150.

FIG. 3A illustrates an example graph of angular velocity of the gear 110 of FIG. 1 (or linear velocity of gear 110' in FIG. 2) between a stored state and a deployed state. In a typical prior art system, a constant force is applied to the load that is being deployed, thereby inducing a constant increase in velocity, as illustrated by the dashed line in FIG. 3A. When the load hits the deployment stop, the velocity is reduced to zero quickly, imparting a substantial force onto the stop and recoil onto the deployment system. A damped prior art system reduces the terminal velocity at the stop, but as discussed above, the terminal velocity is difficult to reliably control to a low level via damping, due to the variance in damping factors typically experienced, and particularly in view of the potential of deployment failure if the system is overdamped.

In accordance with this invention, the average velocity of deployment is limited. As illustrated by the solid saw-tooth waveform in FIG. 3A, the deployment mass receives impulses of force that induce a velocity increase for a short period, then a reduction in velocity. By imparting the force periodically, rather than continuously, the average velocity of the deployment mass can be controlled. The average velocity of the gear 100 of FIG. 1 is substantially determined by the amount of movement of the gear divided by the amount of time to achieve that amount of movement. Using the example escapement system 105 of FIG. 1, if the force from the spring 132 causes the gear 100 to move quickly, the next tooth of the teeth 116 will engage the pallet 126 sooner than if the gear 100 were moved slowly. The time that the pallet 126 remains engaged with each tooth, however, is controlled by the oscillation of the balance 120, and is substantially independent of the force from the spring 132 that is applied to the gear 100, or equivalently, independent of how quickly the gear 100 moves between each engagement with the pallet 126. Because the balance 120 determines the amount of time between each gear movement, and the structure of the pallet 126 and teeth 116 determine the amount of movement of the gear 100 with each gear movement, it can be seen that the average velocity of the gear 100 is independent of the force from the spring 132 on the gear 100. In like manner, the average velocity of the load 150 is a scaled value of the average velocity of the gear 100, and is determined by the gear ratios or other parameters related to the coupling of the gear 100 to the load 150, independent of the force from the spring 132 on the load 150.

Note also that, because the average velocity will be limited by the periodic application of impulses of force, the deployment system can be configured to apply more force at each impulse than a conventional system. As illustrated in FIG. 3, the slope of the rising edge of each of the sawtooth segments corresponds to the amount of force that is applied at each interval in accordance with this invention, and the slope of the rising edge of the dashed-line corresponds to the amount of force that is applied in a conventional deployment system. Because of the need to limit the terminal velocity in a conventional deployment system, the conventional deployment system must limit the force that is applied, to thereby limit the rate of velocity increase. In this invention, because a limit is imposed on the average velocity at each energy-transfer period, the force can be increased without fear of exceeding a maximum terminal velocity.

In a preferred embodiment, the average velocity will be determined by the required deployment speed. Within each energy-transfer period, the peak velocity can also be controlled, by controlling the time that the force of the spring 132 in FIG. 1 is continuously applied to the gear 100 and consequently the load 150. For example, by using finer spacing between the teeth 116 and an appropriately faster balance mechanism 120, the peak velocity within each gear movement period will be reduced, although the same average velocity will be maintained.

A saw-tooth velocity function is shown in FIG. 3A for ease of illustration, implying that the load is accelerated from zero velocity and decelerated to zero velocity during each period of energy-transfer. One of ordinary skill in the art will recognize that alternative velocity waveforms can be achieved by employing different arrangements of gears and other mechanical devices, common in the art. For example, if the load 150 is coupled to the gear 110 using a "freewheeling", or ratcheted, device that only receives energy from the gear 110 when its velocity attempts to drop below the velocity of the gear 110, the velocity waveform will appear as illustrated in FIG. 3B.

In FIG. 3B, the dashed line corresponds to the velocity of the timing gear, and the solid line corresponds to the velocity of the load. When the timing gear is slowed or stopped by the escapement, the load continues to move at the velocity imparted by the timing gear, less any braking effects caused by friction and other factors. When the timing gear is again accelerated, it will engage the load when its velocity matches the velocity of the load, and will again increase the velocity of the load.

One of ordinary skill in the art will recognize that the scale of the solid line could differ from the scale of the dashed line, depending upon the arrangement of gears or other mechanical devices between the timing gear and the load. One of ordinary skill in the art will also recognize that the amount of velocity lost (the depth of the "dip" of the solid line) within each gear-tooth cycle will depend upon the losses associated with the deployment of the load, such as friction forces that tend to reduce the velocity of the load. In a conventional deployment system, as in this invention, the amount of force that is applied is intended to be able to overcome a worst-case friction effect, and other adverse effects, to initiate and maintain movement of the load. In a conventional system, if the actual adverse effects are slight, the excess force translates into a higher terminal velocity, and higher shock effects. In this system, if the actual adverse effects are slight (less depth to each dip), the timing gear will engage the load later in each cycle, thereby transferring less energy to the load, minimizing the aforementioned 'excess' force that is applied to the load. In like manner, if the actual adverse effects are large (more depth to each dip), the timing gear will engage the load earlier in each cycle, thereby transferring more energy to the load. This self-regulating control of energy-transfer allows for the design of high-energy transfer schemes, to assure deployment, without the conventional concerns regarding the dissipation of the accumulated high-energy when the deployed state is reached. Additionally, the relatively smooth motion of the load under typical (i.e. substantially better than worst-case) conditions minimizes the perturbations in a spacecraft's trajectory typically caused by deployments, thereby reducing the amount of fuel consumed for attitude control. Other means of providing a smooth motion from a series of impulses are common in the art, such as those used to provide an apparent continuous motion of a second hand of a watch, or clock.

For completeness, FIGS. 4A and 4B illustrate an example spacecraft 400 that includes deployment devices 100 that are configured to deploy panels 150. FIG. 4A illustrates the spacecraft 400 with the panels 150 at a stored state, such as used when the spacecraft 400 is launched. In this state, the springs of the deployment devices are preloaded, to store the energy that will subsequently be used to apply the required force to move the panels 150 to effect their deployment. FIG. 4B illustrates the spacecraft 400 with the panels 150 in their deployed state. As detailed above, the deployment devices 100 each contain a regulator, preferably in the form of an escapement, that limit the velocity of the movement of the panels 150, substantially independent of the amount of force applied to the panels 150 by the springs of the deployment device 100, thereby providing for a well controlled deployment without substantial risk of shock damage.

The foregoing merely illustrates the principles of the invention. It will thus be appreciated that those skilled in the art will be able to devise various arrangements which, although not explicitly described or shown herein, embody the principles of the invention and are thus within the spirit and scope of the following claims.

I claim:
1. A spacecraft comprising:
    at least one object that occupies:
        a first space relative to the spacecraft when the spacecraft is launched, and
        a second space relative to the spacecraft when the spacecraft is in its operational orbit, and
    a deployment system that is configured to effect movement of the at least one object from the first space to the second space;
    the deployment system comprising:
        a spring that is configured to apply a force to effect the movement of the object from the first space to the second space, and
        a regulator that is configured to limit the movement of the object to an average velocity that is substantially independent of the force applied by the spring.
2. The spacecraft system claim 1, wherein
    the regulator includes an escapement that is configured to apply the force to the object as a series of energy-transfer pulses.
3. The spacecraft system of claim 2, wherein
    the escapement includes a balance that is configured to periodically limit application of the force to the object, thereby providing the series of energy-transfer pulses.
4. The spacecraft system of claim 2, wherein
    the escapenlent includes a pallet that is configured to periodically engage teeth in a gear that is operably coupled to the object, thereby periodically restraining movement of the gear.
5. The spacecraft system of claim 1, further including
    a hinge, operably coupled to the spring and the regulator, that is configured to effect an angular deployment of the object from the first state to the second state.
6. The spacecraft system of claim 1, further including
    a piston, operably coupled to the spring and the regulator, that is configured to effect a linear deployment of the object from the first state to the second state.
7. A method of deploying an object on a spacecraft from a first space relative to the spacecraft to a second space relative to the spacecraft, comprising:
    preloading a spring so as store potential energy that can be used to apply a force to the object to effect a movement of the object, and
    regulating the movement of the object to an average velocity that is substantially independent of the force applied to the object.
8. The method of claim 7, wherein
    regulating the movement of the object includes
        applying the force to the object as a series of energy-transfer pulses.
9. The method of claim 7, wherein
    regulating the movement of the object includes
        periodically limiting application of the force to the object to control the average velocity.
10. The method of claim 7, wherein
    regulating the movement of the object includes
        engaging teeth in a gear that is operably coupled to the object, thereby restraining movement of the gear.
11. The method of claim 7, further including
    effecting an angular deployment of the object from the first state to the second state.
12. The method of claim 7, further including
    effecting a linear deployment of the object from the first state to the second state.

* * * * *